Figure 1:
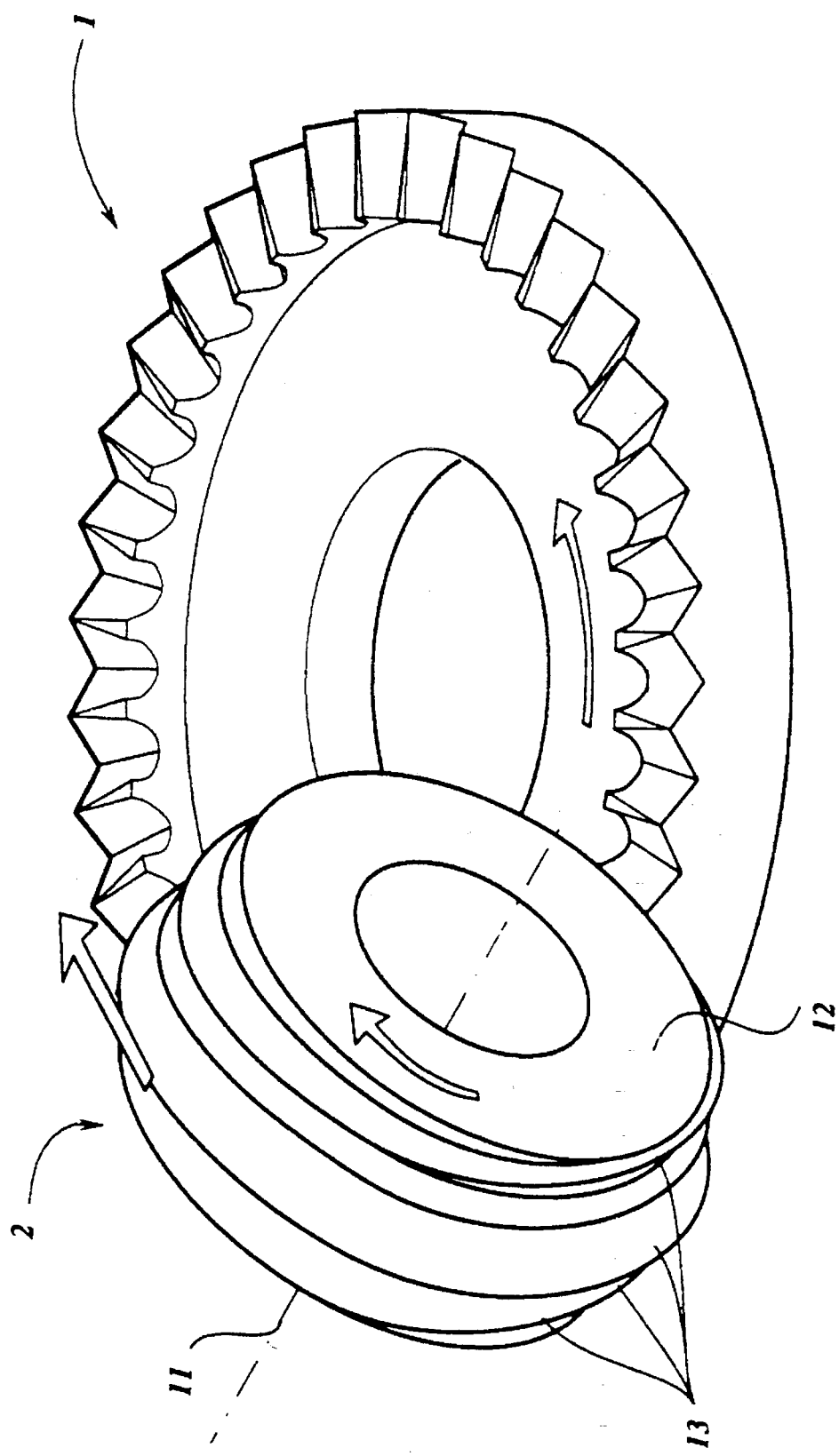

United States Patent [19]
Basstein et al.

[11] Patent Number: 5,622,459
[45] Date of Patent: Apr. 22, 1997

[54] TOOL FOR MANUFACTURING CROWN WHEELS

[75] Inventors: Augustinus F. H. Basstein, Prinsenbeek; Gustaaf A. Uittenbogaart, Overveen; Anne L. Sijtstra, Rotterdam, all of Netherlands

[73] Assignee: Crown Gear B.V., Netherlands

[21] Appl. No.: 464,840

[22] PCT Filed: Feb. 3, 1994

[86] PCT No.: PCT/NL94/00028
§ 371 Date: Jun. 7, 1995
§ 102(e) Date: Jun. 7, 1995

[87] PCT Pub. No.: WO94/17945
PCT Pub. Date: Aug. 18, 1994

[30] Foreign Application Priority Data

Feb. 4, 1993 [NL] Netherlands ............................ 9300226

[51] Int. Cl.$^6$ ........................................................ B23F 5/27
[52] U.S. Cl. .................................. 407/23; 409/11; 409/32; 407/29; 407/24
[58] Field of Search ....................... 407/20, 21, 23, 407/24, 25, 26, 27, 28, 29; 409/11, 20, 21, 22, 23, 24, 31, 32; 451/47, 114, 547

[56] References Cited

FOREIGN PATENT DOCUMENTS

| 2066595 | 3/1991 | Canada ............................ B23F 21/16 |
| 1527125 | 11/1969 | Germany . |
| 2240951 | 2/1974 | Germany ........................ B23F 21/16 |
| 8902417 | 4/1991 | Netherlands ..................... B23F 21/02 |

*Primary Examiner*—Daniel W. Howell
*Assistant Examiner*—Henry W. H. Tsai
*Attorney, Agent, or Firm*—Deveau, Colton & Marquis

[57] ABSTRACT

A tool for manufacturing crown wheels by means of a machining hobbing process, which consists of a disc which can rotate about its axis and on the circumference of which machining elements are disposed whose cutting edges lie in the surface of a profile which mainly extends over the circumference of the disc as helical ribs. In each cross-sectional plane perpendicular to the screw direction of the ribs, the profile has the shape of a number of profile teeth situated next to one another. The profile shape is based on the base geometry of a pinion which is characteristic for the crown wheel to be manufactured and has involute toothing. The profile has such a shape that a part thereof lies outside the surface of revolution which is formed by rotation of the addendum circle of the characteristic pinion about the rotational axis of the tool. As a result, the tool has machining elements or machining element parts whose cutting edges lie in the surface of the portion of the profile outside the surface of revolution formed by rotation of the addendum circle and can serve for performing a premachining operation when manufacturing a crown wheel.

6 Claims, 3 Drawing Sheets

TOOL FOR MANUFACTURING CROWN WHEELS

The invention relates to a tool for manufacturing crown wheels, whose pressure angle is between a minimum and a maximum value, by means of a machining hobbing process, in which a tool and a workpiece rotate with a constant ratio of the rotational speeds and move with respect to one another in such a way that the tool continuously machines the workpiece, said tool consisting of a disc which can rotate about its axis and on the circumference of which machining elements are disposed whose cutting edges lie in the surface of a profile which extends over the circumference of the disc as substantially helical ribs, the profile having the shape, in each cross-sectional plane perpendicular to the screw direction of the ribs, of a number of profile teeth situated next to one another, said profile shape being based on the base geometry of a pinion which is characteristic for the crown wheel to be manufactured and has involute toothing, and of which the centre of the base circle lies on a circle which lies in a plane perpendicular to the rotational axis of the tool and of which the centre lies on said rotational axis, in such a way that each of the two flanks of each profile tooth is formed by a straight line which is perpendicular to a tangent to the base circle of the characteristic pinion and/or a part of an involute of said base circle, of which the position of the foot on the base circle coincides with the foot of an involute of a tooth of the characteristic pinion on the base circle.

Such a tool is disclosed by the published International Patent Application No. PCT/NL/9100245 of the Applicant.

The tool disclosed by said patent application is satisfactory per se. It is found, however, that the machining times are relatively long. Said machining times are determined by the maximum permissible starting speed which, in the case of a gear wheel milling cutter, is determined by the maximum permissible depth of cut. Too high a starting speed gives rise to excessive wear of the tool.

The object of the present invention is to improve the known tool in such a way that the machining times can be shortened.

This object is achieved according to the invention by means of a tool of the type mentioned in the preamble, which is characterized in that the profile extending over the circumference of the disc has such a shape that a part thereof lies outside the surface of revolution which is formed by rotation of the addendum circle of the characteristic pinion about the rotational axis of the tool, so that the tool has machining elements or machining element parts whose cutting edges lie in the surface of said portion of the profile and can serve for performing a premachining operation when manufacturing a crown wheel.

The invention is based on the insight that it is possible to raise the existing ribs of the profile extending over the circumference of the disc to outside the addendum circle of the characteristic pinion, and to dispose in this region further ribs, in addition to the existing ribs, without this influencing the shape of the active portion of the teeth of the crown wheel to be manufactured.

By virtue of this measure according to the invention, the starting speed can be increased considerably and thus the machining times can be shortened, without this having an adverse effect on the useful life of the tool. It is found that in the case of a milling cutter the starting speed can be increased by approximately a factor of 4 with the depth of cut remaining constant.

A very expedient embodiment of the tool according to the invention is characterized in that, in each cross-sectional plane perpendicular to the screw direction of the ribs, the flank of each profile tooth which is directed towards the profile centre line, which passes through the centre of the base circle of the characteristic pinion and is perpendicular to the rotational axis of the tool, is formed, in the region between the base circle of the characteristic pinion and a first tangent to said base circle, whose point of tangency is situated on the same side of the centre line as the tooth flank in question and whose radius vector from the centre of the base circle to the point of tangency makes an angle with the centre line, which is equal to the maximum pressure angle of the crown wheel to be manufactured, by a part of the branch of an involute of the base circle which intersects the first tangent at a right angle, and in the region which, seen from the rotational axis of the tool, lies outside the first tangent, by a tangent to the branch of the involute which intersects the first tangent at a right angle, at the location of the intersection of said branch of the involute with the first tangent, and the flank of each profile tooth which is directed away from the centre line of the profile, is formed, in the region which, seen from the rotational axis of the tool, lies outside a second tangent to the base circle, whose point of tangency is situated on the other side of the centre line than the tooth flank in question and whose radius vector from the centre of the base circle to the point of tangency makes an angle with the centre line, which is equal to the minimum pressure angle of the crown wheel to be manufactured, by a part of the branch of an involute of the base circle which intersects the second tangent at a right angle, and in the region which, seen from the rotational axis of the tool, lies inside the second tangent, by a tangent to the branch of the involute which intersects the second tangent at a right angle, at the location of the intersection of said branch of the involute with the second tangent, the two flanks of each profile tooth converging on the outer circumference of the tool.

This embodiment imparts a maximum extension to the machining elements, so that, during the manufacture of a crown wheel, maximum premachining can take place. The final profile of the crown wheel teeth is formed by the cutting edges of the machining elements which lie on the involute and is not affected by the premachining.

Figure 2:
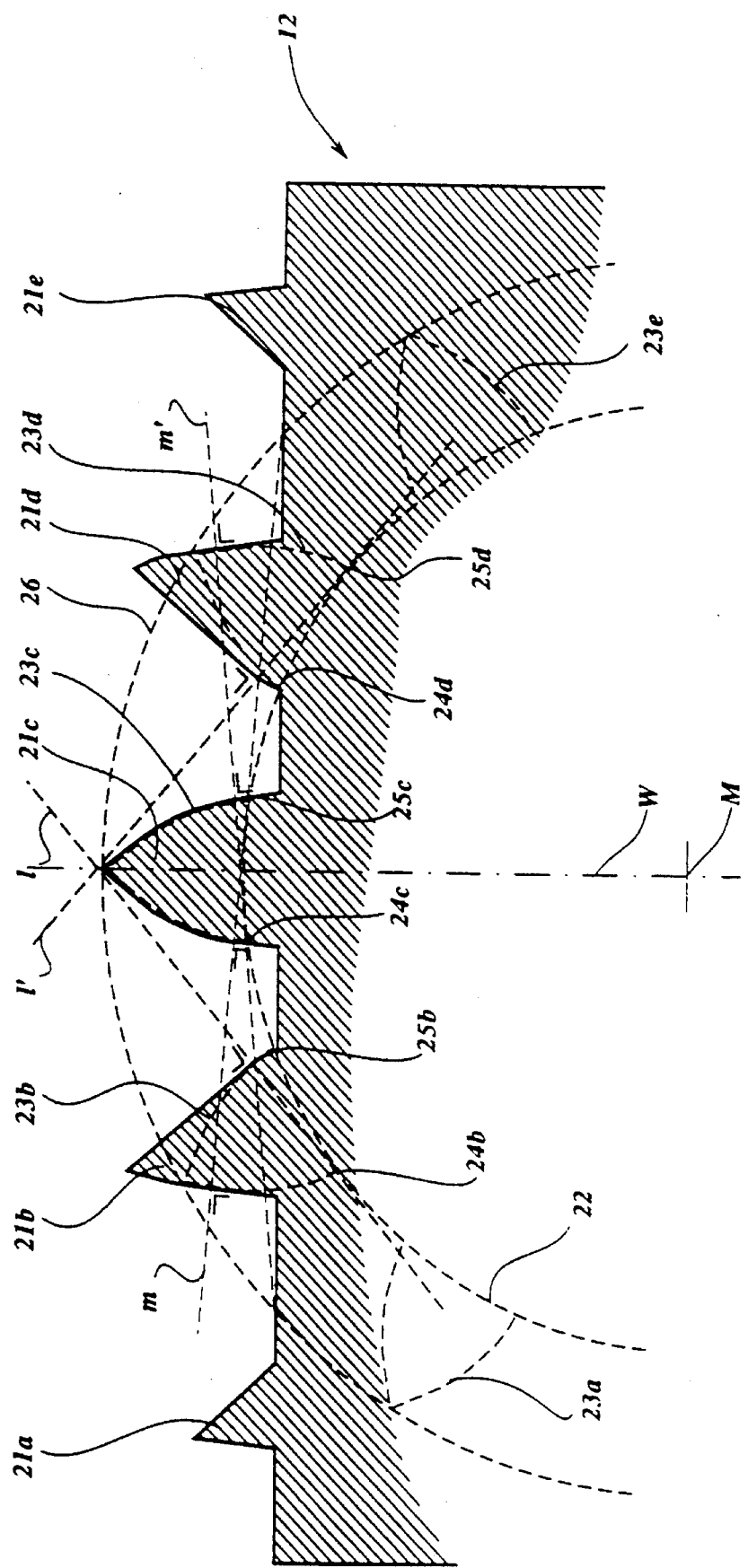
Figure 3:
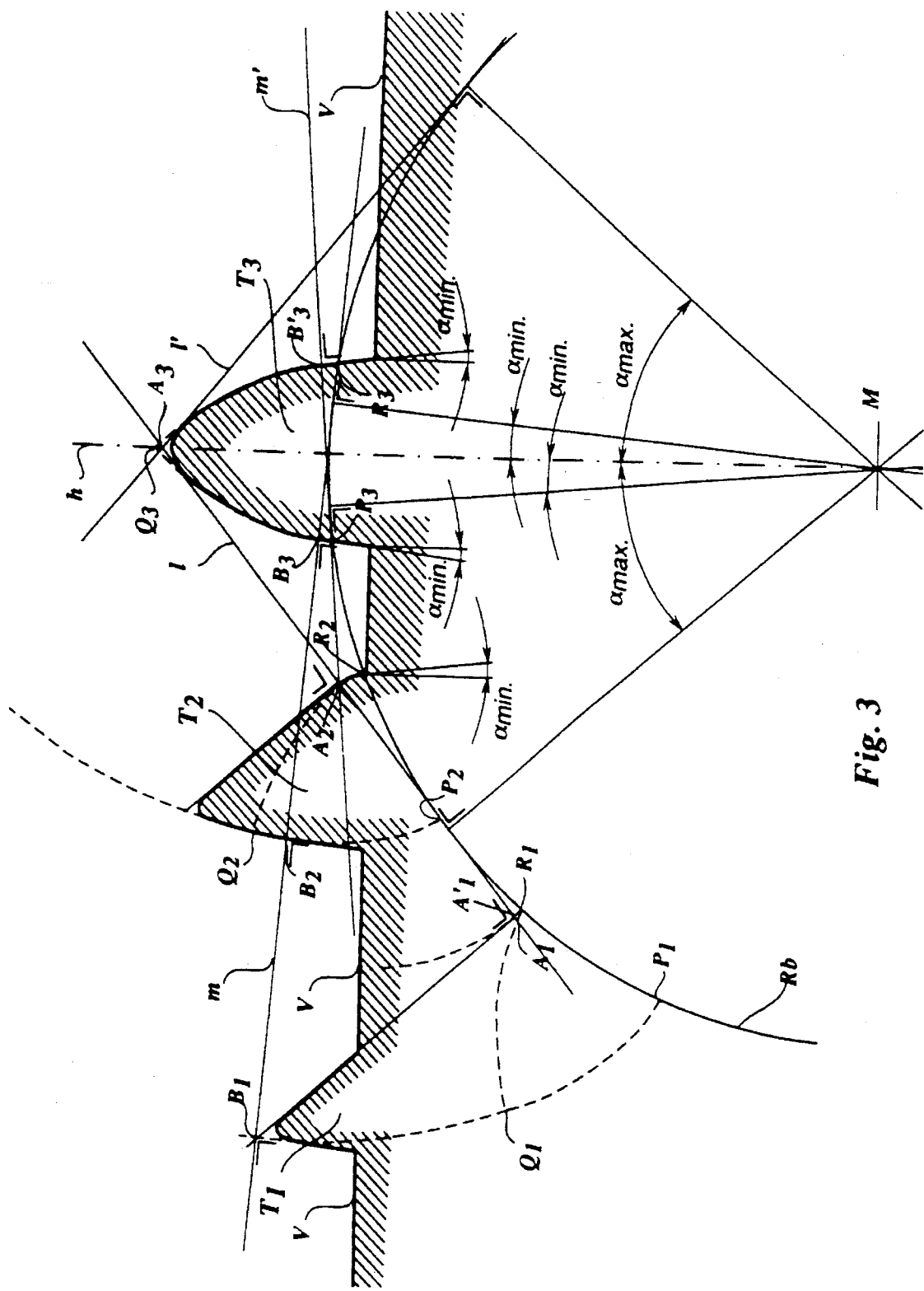

The invention is explained in more detail in the following illustrative embodiments with reference to the accompanying drawings, in which:

FIG. 1 depicts, in diagrammatic form, the machining of a crown wheel by a tool according to the invention, FIG. 2 is one particular cross-section of the circumferential part of a tool according to the invention, and FIG. 3 indicates how the shape of profile teeth of the tool according to the invention is constructed.

FIG. 1 shows, in diagrammatic form, the machining of a crown wheel 1 by tool 2 according to the invention. Machining takes place in a hobbing process, in which the tool 2 and the workpiece 1 rotate with a constant ratio of the rotational speeds and move with respect to one another in such a way that the tool continuously machines the workpiece. The tool 2 consists of a disc 12 which can rotate about its axis 11 and on the circumference of which machining elements are disposed whose cutting edges lie in the outer surface of a profile which extends over the circumference of the disc as substantially helical ribs 13. FIG. 2 depicts one particular cross-section of the circumferential portion of the tool 2, which cross-section is taken perpendicular to the screw direction of the ribs.

In the cross-section of FIG. 2 and in any other cross-section perpendicular to the screw direction of the ribs, the profile on the disc 12 has the shape of a number of adjacent profile teeth 21a–e. The profile shape is based on the base geometry of a pinion, characteristic for the crown wheel 11 to be manufactured, having involute toothing. FIG. 2 indicates, as broken lines, the base circle 22 and the involute toothing 23a–e of the characteristic pinion. The centre M of the base circle 22 lies on a circle which lies in a plane W perpendicular to the rotational axis 11 of the tool (not shown in FIG. 2) and whose centre lies on said rotational axis. The two flanks of each profile tooth 21b–d are formed, as in the known tool according to PCT/NL/9100245, by a straight line perpendicular to a tangent l, l', or m, m' to the base circle 22 of the characteristic pinion and/or a part of an involute of said base circle 22, of which the location of the foot on the base circle coincides with the foot 24b–d; 25b–d of an involute of a tooth 23b–d of the characteristic pinion on the base circle 22.

According to the invention, the profile extending over the circumference of the disc 12 has such a shape that a portion thereof lies outside the surface of revolution which is formed by rotation of the addendum circle 26 of the characteristic pinion about the rotational axis 11 of the tool. In a cross-section, such as in FIG. 2, this manifests itself by parts of profile teeth (profile teeth 21b–d) or entire profile teeth (profile teeth 21a and 21e) lying outside the addendum circle 26 of the characteristic pinion, seen from the centre M.

When manufacturing a crown wheel, the machining elements whose cutting edges lie on the portion of the profile lying outside the addendum circle of the characteristic pinion perform a premachining operation. As a result, compared to the known tool, the depth of cut is considerably reduced for the same starting speed. If the depth of cut is kept constant, the starting speed can be increased. This leads to a considerable shortening of the processing time. An increase of the starting speed by a factor 4 is possible.

The final shape of the crown wheel teeth is determined by that portion of the profile which, in cross-section, has the shape of an involute.

It will be explained hereinafter, with reference to FIG. 3, how the shape of the profile teeth of the tool is constructed. The profile tooth shape in FIG. 3 corresponds to that in FIG. 2. In the case of the profile tooth shape depicted in FIGS. 2 and 3, the machining elements have maximum extension.

The starting point in defining the profile tooth shape is the centre line h of the profile. Located on the centre line h there is the centre M of the base circle $R_b$, on which the feet of the involutes for the teeth $T_1$, $T_2$ and $T_3$ of the characteristic pinion, $P_1$ and $R_1$, $P_2$ and $R_2$ and $P_3$ and $R_3$, respectively lie. $P_1Q_1$, $R_1Q_1$, $P_2Q_2$ and $R_2Q_2$ and $P_3Q_3$ and $R_3Q_3$ are then the involutes of the teeth of the pinion characteristic for the crown wheel.

The crown wheel is characterized by its minimum and maximum pressure angle, where the smallest pressure angle $\alpha_{minimum}$ is located on the internal diameter of the crown wheel and the maximum pressure angle $\alpha_{maximum}$ on the outer diameter thereof. When making the cutting edge of the tool, use is likewise made of the abovementioned extreme values for the pressure angle.

In order to find that shape of the profile tooth flank which is associated with the feet P and R of the involute, the tangents l and m are determined whose radius vectors to the point of tangency on the base circle form angles of $\alpha_{maximum}$ and $\alpha_{minimum}$, respectively, with the profile centre line h, the radius vectors lying on the other side of the profile centre line h than the tooth flank in question with respect to the centre of the tooth. This therefore means that the tangent with the radius vector to the left of the centre line h is important for defining the right-hand tooth flank and vice versa.

As shown in FIG. 3, the tooth flank facing away from the profile centre line h is constructed by determining the intersections $B_1$, $B_2$ and $B_3$ of the involutes of said flank or the extension thereof with the tangent m, which involutes intersect the tangent m perpendicularly.

That part of the involute which lies above the tangent m forms part of the cutting edge, while below the tangent m the cutting edge is formed by the tangent to the involute at the location of $B_1$, $B_2$, $B_3$, respectively, the direction of the tangent being identical to the perpendicular to the tangent m.

As can be seen from FIG. 3, at $T_3$ both flanks face away from the profile centre line h. The second flank of T3 correspondingly has an intersection $B_3'$ with the tangent m'.

The tooth flank facing the profile centre line h is constructed by determining the intersections $A_1$, $A_2$ and $A_3$ of the involute of the flank with the tangent l. In so doing it is found that, in the situation at tooth T1, the involute of the tooth of the characteristic pinion does not intersect the line l perpendicularly, because the foot $R_1$ is located beyond the radius vector from the centre M to the tangent l. In this case, the other branch of the involute from the same foot $R_1$ is used, which gives rise to the intersection $A_1'$. This branch of the involute intersects the tangent l perpendicularly. The cutting edge is formed, in the region below the tangent l, by the involute and, in the region above the tangent l, by the tangent to the involute in the intersection of the involute with tangent l.

The two tooth flanks intersect. In order to extend the useful life of the cutting edge and to minimize undercutting in the crown wheel, the tooth tip may be rounded. It is found that, owing to the tool profile chosen, some undercutting occurs in the tooth root of the crown wheel teeth to be shaped. Said undercutting is negligibly small, however, if the rounding radius is made sufficiently large.

Since the teeth of the crown wheel to be shaped have a limited height, the depth of the tooth spaces between the profile teeth can be limited, as is indicated here by the line V. Where the base circle lies outside the boundary defined by the line V, the tooth flanks are formed, from the foot of the involute to the line V, by the line which makes an angle $\alpha_{minimum}$ with the centre line h.

The shape of the profile teeth on the other side of the centre line h, which teeth are not indicated in FIG. 3, is determined correspondingly, the tangents l' and m' being used as a starting point.

The hobbing tool according to the invention can be embodied as a hobbing milling cutter in the form of a disc having cutting teeth which are disposed on the circumference and are evenly distributed over the circumference. The cutting edges of said cutting teeth then lie in the surface of the profile described hereinabove.

The hobbing tool according to the invention may also be embodied as a hobbing grinding disc in the form of a disc having disposed on its circumference a series of continuous ribs which are situated next to one another and extend in a circumferential direction. Said ribs are provided at their surface with grinding material in such a way that the cutting edges of the grinding material lie in the surface of the profile described hereinabove.

We claim:

1. A tool for manufacturing crown wheels by means of a machining process, said tool comprising:

a disc having an axis of rotation and being rotatable about said axis, said disc having a circumference and a profile extending over the circumference of said disc; and a plurality of machining elements disposed on the circumference of said disc, said machining elements having cutting edges which form substantially helical ribs on the circumference of said disc, wherein said ribs define said profile and correspond to cutting teeth for forming teeth in said crown wheel, and wherein said profile is based on an involute toothed pinion geometry which is characteristic of the crown wheel to be manufactured by said tool, said pinion geometry including a base circle and an addendum circle, and wherein at least a portion of at least one of said machining elements lies outside a surface of revolution formed by rotation of the addendum circle about the axis of rotation of said tool, and wherein said portion performs a premachining operation when manufacturing a crown wheel with said tool.

2. A tool according to claim 1 wherein each of said cutting teeth is defined by two flanks which converge to form a tip of the cutting tooth, wherein a first flank of each cutting tooth is directed towards a profile center line which passes through the center of the base circle and which is perpendicular to the rotational axis of the tool, wherein said first flank is formed in a region between the base circle and a first tangent to said base circle, whose point of tangency is situated on the same side of the center line as said first flank and whose radius vector from the center of the base circle to the point of tangency forms an angle with the center line which is equal to a maximum pressure angle of the crown wheel to be manufactured, by a part of the branch of an involute of the base circle which intersects the first tangent at a right angle, and in the region which, seen from the rotational axis of the tool, lies outside the first tangent, by the tangent to the branch of the involute which intersects the first tangent at a right angle, at the location of the intersection of said branch of the involute with the first tangent, and wherein the second flank of each profile tooth which is directed away from the center line of the profile is formed in a region which, viewed from a reference point located on the rotational axis of the tool, lies outside a second tangent to the base circle, whose point of tangency is separated from the first tangent by the center line and whose radius vector from the center of the base circle to the point of tangency makes an angle with the center line which is equal to the minimum pressure angle of the crown wheel to be manufactured by a part of the branch of an involute of the base circle which intersects the second tangent at a right angle, and in the region which, seen from the rotational axis of the tool, lies inside the second tangent, by the tangent to the branch of the involute which intersects the second tangent at a right angle, at the location of the intersection of said branch of the involute with the second tangent, and wherein the two flanks of each cutting tooth converge on the outer circumference of the tool.

3. A tool according to claim 2 wherein the two flanks of each cutting tooth converge to form a rounded tip having a predetermined minimum rounding radius.

4. A tool according to claim 2 wherein in the region inside the base circle the flank of each cutting tooth which is directed towards the center line of the profile is formed by a straight line which forms an angle with the center line which is essentially equal to the minimum pressure angle of the crown wheel to be manufactured.

5. A tool according to any one of claims 1–4 wherein said tool is a milling cutter and wherein the machine elements are cutting knives.

6. A tool according to any one of claims 1–4 wherein said tool is a grinding disc and wherein the machining elements are abrasive particles.

* * * * *